US008625536B2

(12) United States Patent
Ootani

(10) Patent No.: US 8,625,536 B2
(45) Date of Patent: Jan. 7, 2014

(54) COMMUNICATION SYSTEM, COMMUNICATION CONTROL DEVICE, RADIO BASE STATION, AND COMMUNICATION CONTROL METHOD

(75) Inventor: Taro Ootani, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 314 days.

(21) Appl. No.: 13/203,240

(22) PCT Filed: Feb. 25, 2010

(86) PCT No.: PCT/JP2010/053009
§ 371 (c)(1),
(2), (4) Date: Aug. 24, 2011

(87) PCT Pub. No.: WO2010/098410
PCT Pub. Date: Sep. 2, 2010

(65) Prior Publication Data
US 2011/0305166 A1    Dec. 15, 2011

(30) Foreign Application Priority Data

Feb. 25, 2009    (JP) .................................. 2009-043190

(51) Int. Cl.
*H04W 4/00*    (2009.01)
(52) U.S. Cl.
USPC ......................................................... 370/331
(58) Field of Classification Search
None
See application file for complete search history.

(56) References Cited

U.S. PATENT DOCUMENTS

| 2008/0192682 | A1* | 8/2008 | Matsumoto et al. | 370/328 |
| 2009/0163223 | A1* | 6/2009 | Casey | 455/453 |
| 2010/0067450 | A1* | 3/2010 | Balachandran et al. | 370/329 |
| 2010/0069091 | A1* | 3/2010 | El-Saidny | 455/456.3 |
| 2011/0244874 | A1* | 10/2011 | Fodor et al. | 455/450 |

FOREIGN PATENT DOCUMENTS

| JP | 2003-078938 A | 3/2003 |
| JP | 2006-005502 A | 1/2006 |
| JP | 2007-116716 A | 5/2007 |
| JP | 2008-211645 A | 9/2008 |

OTHER PUBLICATIONS

International Search Report and Written Opinion dated Jun. 8, 2010 issued by the Japanese Patent Office for International Application No. PCT/JP2010/053009.
Notification of Reasons for Refusal dated May 7, 2013 issued in counterpart Japanese Application No. 2011-501652.

* cited by examiner

*Primary Examiner* — Chirag Shah
*Assistant Examiner* — Amar Persaud
(74) *Attorney, Agent, or Firm* — Procopio, Cory, Hargreaves & Savitch LLP

(57) ABSTRACT

For each radio base stations (2A to 2C), a communication control device (1) collects information on the number of unused EPS bearers passing through the radio base station, and transmits the numbers to the radio base stations (2A to 2C). Further, based on the received number of unused EPS bearers, the radio base stations (2A to 2C) perform control to select, as a connection destination radio base station of a radio terminal (3), the radio base station other than the radio base station having unused EPS bearers passing through is not larger than a predetermined number.

11 Claims, 6 Drawing Sheets

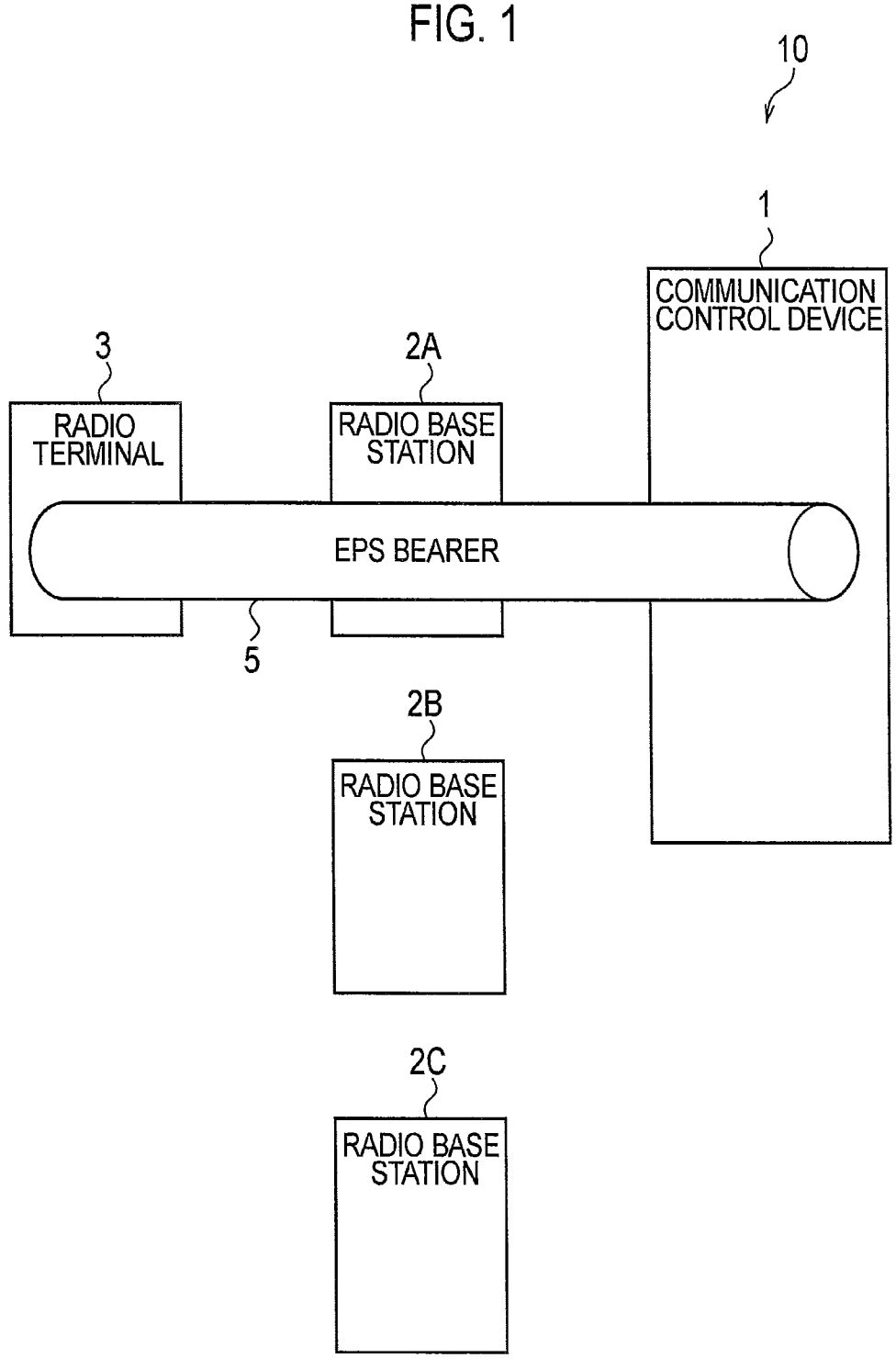

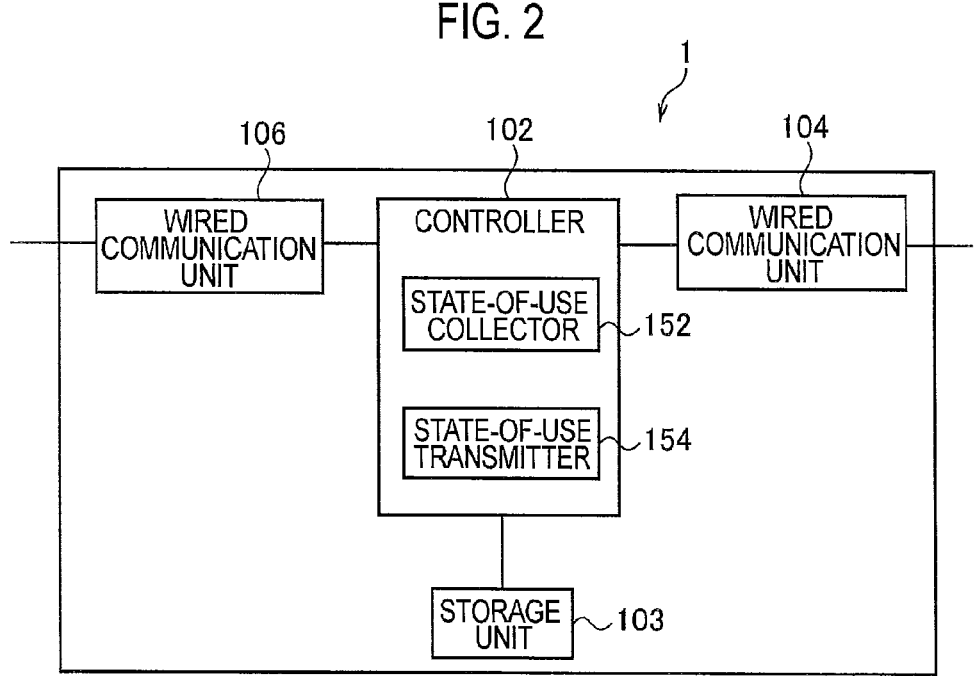

COMMUNICATION SYSTEM, COMMUNICATION CONTROL DEVICE, RADIO BASE STATION, AND COMMUNICATION CONTROL METHOD

TECHNICAL FIELD

The present invention relates to: a radio communication system that includes a radio terminal, multiple radio base stations each configured to perform radio communications with the radio terminal, and a communication control device configured to control the multiple radio base stations, and establishes a logical communication path between the radio terminal and the communication control device through one of the radio base stations; a communication control device in the communication system; a radio base station in the communication system; and a radio communication method in the communication system.

BACKGROUND ART

LTE (Long Term Evolution) in 3GPP (3rd Generation Partnership Project) is a technique after the 3rd generation mobile phone (3G) communication schemes such as W-CDMA and CDMA 2000, which are currently in widespread use, and before the upcoming 4th generation mobile phone (4G) communication scheme. LTE is also known as the 3.9th generation mobile phone (3.9G) communication scheme.

A radio communication system employing LTE establishes a logical communication path called an EPS (Evolved Packet System) bearer between a radio terminal and a communication control device through a radio base station (see, Patent Document 1, for example). The number of EPS bearers passing through a radio base station is predetermined based on how the radio base station is used. The radio terminal, the radio base station, and the communication control device can use multiple bearers for communication in accordance with the amount of data to be transmitted.

PRIOR ART DOCUMENT

Patent Document

PATENT DOCUMENT 1: Japanese Patent Application Publication NO. 2007-116716

SUMMARY OF THE INVENTION

In the above-described communication system, the communication control device sometimes requests the radio base station to add the EPS bearer depending on the communication state such as QoS state. In such case, the radio base station determines whether the addition is possible based on the state of use of the EPS bearers passing therethrough, and notifies the communication control device of the determination result. When the EPS bearer cannot be added, the communication continues with the EPS bearers established so far and the communication quality degrades.

The call connection request from the radio terminal to the radio base station makes the radio base station determine whether the call can be connected based on the state of use of the EPS bearers passing therethrough. The call that cannot be connected is released.

In view of the above problem, an object of the present invention is to provide a communication system, a communication control device, a radio base station, and a communication control method with which logical communication paths can be appropriately established.

To solve the above problem, the present invention has following features. A first feature of the present invention is summarized as a communication system (radio communication system 10) including a radio terminal (radio terminal 3), a plurality of radio base stations (radio base stations 2A to 2C) configured to perform radio communication with the radio terminal, and a communication control device (communication control device 1) controlling the plurality of radio base stations, in which logical communication paths are established between the radio terminal and the communication control device through each of the radio base stations, wherein the communication control device includes: a collector (state of use collector 152) configured to collect, for each of the radio base stations, a state of use of the logical communication paths passing through the radio base station; and a state-of-use transmitter (state-of-use transmitter 154) configured to transmit, to the plurality of radio base stations, the state of use of the logical communication paths passing through each of the radio base stations collected for the radio base station by the collector, and each of the radio base stations includes: a state-of-use receiver (state-of-use receiver 252) configured to receive the state of use of the logical communication paths passing through each of the radio base stations from the communication control device; and a selection controller (selection controller 254) configured to perform a control to determine the radio base station to which the radio terminal is to be connected based on the state of use of the logical communication paths passing through each of the radio base stations received by the state-of-use receiver.

In such a communication system, the communication control device collects and transmits to each of the radio base stations, the state of use of the logical communication paths passing through each of the radio base stations. Then, the radio base stations performs a control so that a radio base station to which the radio terminal is to be connected is selected based on the received state of use of the logical communication paths. Thus, each of the radio base stations can perform control so that the radio base station to which the radio terminal is to be connected is selected in consideration of not only the state of use of the logical communication paths passing therethrough but also the state of use of logical communication paths passing through the other radio base stations.

Therefore, degradation of communication quality due to the shortage of the unused logical communication paths passing through a radio base station rejecting the request from the communication control device for increasing the logical communication path to the radio base station is prevented. Moreover, when the radio terminal requests call connection to a radio base station, the call is not released due to the shortage of the unused logical communication paths passing through the radio base station.

A second aspect according to the first feature is summarized as that the selection controller performs a control to select, as a connection destination of the radio terminal, a radio base station other than the radio base station of which the number of unused logical communication paths passing through the radio base station among the logical communication paths passing therethrough is not larger than a predetermined number.

A third feature according to the second feature is summarized as that the state-of-use transmitter transmits, to the plurality of radio base stations, information on the radio base station of which the number of unused logical communication paths passing therethrough among the logical communication paths passing through the radio base station is not larger than the predetermined number, and the state-of-use receiver receives, from the communication controller, the information on the radio base station of which the number of unused logical communication paths passing therethrough among the logical communication paths passing through the radio base station is not larger than the predetermined number.

A fourth feature according to the third feature is summarized as that the selection controller selects the radio base station that is not the radio base station of which the number of unused logical communication paths passing therethrough is not larger than the predetermined number from the communication control device as the connection destination of the radio terminal, and transmits information on the radio base station that is the connection destination of the radio terminal to the radio terminal, and the radio terminal includes: a connection destination receiver (receiver 352) configured to receive the information on the radio base station that is the connection destination of the radio terminal from the communication control device; and a connection controller (connection destination controller 354) configured to perform a control to select the connection destination of the radio terminal based on the information on the radio base station that is the connection destination of the radio terminal received by the connection receiver.

A fifth feature according to the third feature is summarized as that the selection controller transmits to the radio terminal, the information on the radio base station of which the number of unused logical communication paths passing therethrough is not larger than the predetermined number from the communication control device, and the radio terminal includes: a base station information receiver (receiver 352) configured to receive the information on the radio base station of which the number of unused logical communication paths passing therethrough is not larger than the predetermined number; and a connection controller (connection destination controller 354) configured to perform control to select, as the connection destination of the radio terminal, a radio base station other than the radio base station of which the number of unused logical communication paths passing through the radio base station among the logical communication paths passing therethrough is not larger than the predetermined number, based on the information on the radio base station of which the unused number of logical communication paths passing therethrough is not larger than the predetermined number.

A sixth feature according to any one of the first to fifth features is summarized as that each of the radio base stations further includes an unused number transmitter (alarm information transmitter 251) configured to transmit the number of unused logical communication paths passing therethrough to the communication control device when the number of unused logical communication paths passing through the radio base station is not larger than the predetermined number.

A seventh feature of the present invention is summarized as a communication control device controlling a plurality of radio base stations communicating with a radio terminal, the communication control device including: a collector configured to collect, for each of the radio base stations, a state of use of the logical communication paths passing through the radio base station; and a state-of-use transmitter configured to transmit, to the plurality of radio base stations, the state of use of the logical communication paths passing through each of the radio base stations collected for the radio base station by the collector.

An eighth feature of the present invention is summarized as a radio base station configured to perform radio communications with a radio terminal and being controlled by a communication control device, the radio base station including: a state-of-use receiver configured to receive the state of use of the logical communication paths passing through each of a plurality of radio base stations from the communication control device; and a selection controller configured to perform a control to determine the radio base station to which the radio terminal is to be connected based on the state of use of the logical communication paths passing through each of the radio base stations received by the state-of-use receiver.

A ninth feature of the present invention is summarized as a communication method in a communication system including a radio terminal, a plurality of radio base stations configured to perform radio communications with the radio terminal, and a communication control device controlling the plurality of radio base stations, in which a logical communication paths are established between the radio terminal and the communication control device through each of the radio base stations, the method including the steps of: collecting, for each of the radio base stations, a state of use of the logical communication paths passing through the radio base station by the communication control device; transmitting, by the communication control device, the collected state of use of the logical communication paths passing through each of the radio base stations collected for the radio base station by the collector to the plurality of radio base stations; receiving, by each of the radio base stations, the state of use of the logical communication paths passing through each of the radio base stations from the communication control device; and performing a control, by each of the radio base stations, to determine the radio base station to which the radio terminal is to be connected based on the received state of use of the logical communication paths passing through each of the radio base stations.

A tenth feature of the present invention is summarized as a radio base station, configured to perform radio communication with a radio terminal and controlled by a communication control device, in a communication system employing LTE, the radio base station including a transmitter configured to transmit error information on the radio base station to the communication control device.

A eleventh feature of the present invention is summarized as a communication control device controlling a plurality of radio base stations performing radio communications with a radio terminal in a communication system employing LTE, the communication control device including a transmitter configured to transmit, to the plurality of radio base stations, information on a radio base station to which the connection from the radio terminal for handover is barred.

A twelfth feature of the present invention is summarized as a communication method in a communication system including a radio terminal, a plurality of radio base stations configured to perform radio communications with the radio terminal, and a communication control device controlling the plurality of radio base stations, in which logical communication paths are established between the radio terminal and the communication control device through each of the radio base stations, the method including the steps of: transmitting, by the radio base stations, error information on the radio base stations to the communication control device; and transmitting, by the communication control device, information on a radio base station to which the connection from the radio terminal for handover is barred, to the plurality of radio base stations.

According to the present invention, logical communication paths can be appropriately established.

BRIEF DESCRIPTION OF DRAWINGS

FIG. 1 is an overall schematic configuration view of a radio communication system according to an embodiment of the present invention.

FIG. 2 is a configuration view of a communication control device according to the embodiment of the present invention.

FIG. 3 is a diagram showing an example of alarm information according to the embodiment of the present invention.

FIG. 4 is a diagram showing a list of non-connectable radio base stations according to the embodiment of the present invention.

MODES FOR CARRYING OUT THE INVENTION

Figure 5:
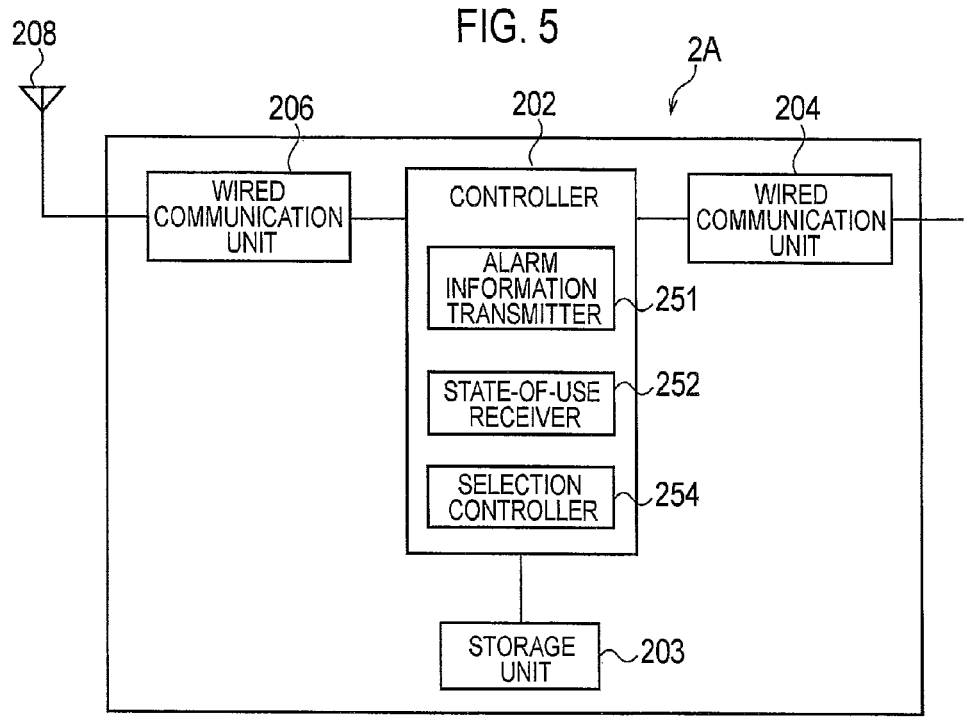
FIG. 5 is a configuration view of a radio base station according to the embodiment of the present invention.

An embodiment of the present invention is described with reference to the drawings. Specifically, descriptions are given on (1) Configuration of Radio Communication System, (2) Operation of Radio communication system, (3) Operation and Effect, and (4) Other Embodiment. In the description of the drawings in the embodiment below, the same or similar parts are given the same or similar reference numerals.

(1) Configuration of Radio Communication System

First, the configuration of a radio communication system according to an embodiment of the present invention is described below in the order of (1.1) Overall Schematic Configuration of Radio Communication System, (1.2) Configuration of Communication Control Device, (1.3) Configuration of Radio Base Station, and (1.4) Configuration of Radio Terminal.

(1.1) Overall Schematic Configuration of Radio Communication System

FIG. 1 is an overall schematic configuration diagram of a radio communication system 10 according to the embodiment of the present invention.

The radio communication system 10 shown in FIG. 1 is a radio communication system employing LTE. The radio communication system 10 includes network apparatuses, namely: a communication control device 1; radio base stations 2A, 2B, and 2C; and a radio terminal 3. In FIG. 1, an EPS bearer, which is a logical communication path, is established between the communication control device 1 and the radio terminal 3 through the radio base station 2A. The communication control device 1 and the radio terminal 3 can communicate with each other using the EPS bearer through the radio base station 2A. For example, the communication control device 1 and the radio terminal 3 can use the maximum of six EPS bearers with each of the radio base stations 2A to 2C.

(1.2) Configuration of Communication Control Device

FIG. 2 is a configuration diagram of the communication control device 1. As shown in FIG. 2, the communication control device 1 includes a controller 102, a storage unit 103, a wired communication unit 104, a wired communication unit 106, and an antenna 108.

The controller 102 is formed of a CPU for example, and controls various functions of the communication control device 1. The storage unit 103 is formed of a memory for example, and stores therein various pieces of information used for the control in the communication control device 1 or the like.

The wired communication unit 104 transmits and receives data to and from an unillustrated upper level network. The wired communication unit 106 transmits and receives data to and from the radio base stations 2A to 2C.

The controller 102 includes a state of use collector 152 and a state-of-use transmitter 154. The state of use collector 154 receives alarm information including the number of unused EPS bearers passing through each of the radio base stations 2A to 2C from each of the radio base stations 2A to 2C through the wired communication unit 106. The state of use collector 154 stores the received alarm information in the storage unit 103.

FIG. 3 is a diagram showing an example of the alarm information. The alarm information shown in FIG. 3 includes an ID of the radio base station (base station ID) that has transmitted the alarm information and the number of unused EPS bearers passing through the radio base station. As described later, the radio base stations 2A to 2C transmits the alarm information to the communication control device 1 when the number of unused bearers passing therethrough is not larger than a predetermined number (e.g., not larger than two).

The state-of-use transmitter 154 reads out alarm information stored in the storage unit 103 to generate the list of non-connectable radio base stations listing the alarm information. FIG. 4 shows an example of the list of non-connectable radio base stations.

The EPS bearers passing therethrough the radio base station, which transmits the alarm information, having the unused number not larger than the predetermined number are preferably left unused considering the EPS addition request from the communication control device 1 and the call connection request from the radio terminal 3 made later. Thus, the state-of-use transmitter 154 regards unusable the EPS bearers passing through the radio base station of which the unused number is not larger than the predetermined number and identified by the base station ID in the alarm information. Then, the state-of-use transmitter 154 generates the list of non-connectable radio base stations that lists the alarm information indicating that the unused number is not larger than the predetermined number.

The state-of-use transmitter 154 transmits the generated list of non-connectable radio base stations to the radio base stations 2A to 2C through the wired communication unit 106.

(1.3) Configuration of Radio Base Station

FIG. 5 is a configuration view of the radio base station 2A. The radio base station 2A shown in FIG. 5 includes a controller 202, a storage unit 203, a wired communication unit 204, a radio communication unit 206, and an antenna 208. The radio bases stations 2B and 2C have the configuration similar to the radio base station 2A and description thereof is omitted.

The controller 202 is formed of a CPU for example and controls various functions of the radio base station 2A. The storage unit 203 is formed of a memory for example, and stores therein various pieces of information used for the control in the radio base station 2A or the like.

The wired communication unit 204 transmits and receives data to and from the communication control device 1. The radio communication unit 206 includes an RF circuit, a base band circuit, and the like, performs modulation/demodulation and encoding/decoding, and transmits and receives a radio signal to and from the radio terminal 3 through the antenna 208.

The controller 202 includes an alarm information transmitter 251, a state-of-use receiver 252, and a selection controller 254.

The alarm information transmitter 251 periodically identifies the unused number of EPS bearers passing through the own radio base station. Then, when the unused number of EPS bearers passing through the own radio base station is not larger than a predetermined number, the alarm information transmitter 251 generates the alarm information including the unused number and the base station ID of the own radio base station. Moreover, the alarm information transmitter 251 transmits the generated alarm information to the communication control device 1 through the wired communication unit 204.

The state-of-use receiver 252 receives the list of non-connectable radio base stations from the communication control device 1 through the wired communication unit 204. Then, the state-of-use receiver 252 stores the received list of non-connectable radio base stations in the storage unit 203.

Based on the list of non-connectable radio base stations stored in the storage unit 203, the selection controller 254 performs a control so that a radio base station which is not the radio base station of which the number of unused EPS bearers among the EPS bearers passing through the radio base stations 2A to 2C is not larger than a predetermined number is selected as the connection destination of the radio terminal 3.

Specifically, the selection controller 254 reads out the list of non-connectable radio base stations from the storage unit 203 and transmits the list of non-connectable radio base stations to the radio terminal 3 through the radio communication unit 206 and the antenna 208. Here, the radio terminal 3 is located in any one of the cells provided by the radio base stations 2A to 2C. Thus, the radio base station 3 receives the list of non-connectable radio bases stations from any one of the radio base stations 2A to 2C providing the cell in which the radio terminal 3 is located.

Alternatively, the selection controller 254 receives the communication quality information from the radio terminal 3 communicating with the own radio base station through the antenna 208 and the radio communication unit 206. The communication quality information is information such as RSSI indicating the quality of communication between the radio terminal 3 and any one of the radio base stations 2A to 2C.

The selection controller 254 regards that the radio terminal 3 needs to be handed over if the communication quality indicated by the communication quality information is not higher than the predetermined level. Then, based on the list of non-connectable radio base stations readout from the storage unit 203, the selection controller 254 selects the radio base station of which the number of unused EPS bearers among the EPS bearers passing through the radio base stations 2A to 2C is not larger than a predetermined number as the new connection destination, i.e., handover destination, of the radio terminal 3.

For example, the storage unit 203 stores therein base station IDs of the peripheral radio base stations. The selection controller 254 specifies as the base station ID of the radio base station to serve as the handover destination, the base station ID not included in the list of non-connectable radio base stations from among the base station IDs stored in the storage unit 203.

The presence of the multiple base station IDs not included in the list of non-connectable radio base stations among the base station IDs stored in the storage unit 203 allows the selection controller 254 to acquire the locations of the radio terminal 3 and the peripheral radio base stations and specify the base station ID of the radio base station closest to the radio terminal 3 except for the own radio base station from among the multiple base station IDs as the base station ID of the radio base station to serve as the hand over destination, for example.

Then, the selection controller 254 generates and transmits to the handover destination radio base station information including the base station ID of the radio base station to serve as the handover destination for the radio terminal 3 through the radio communication unit 206 and the antenna 208. As described above, the radio terminal 3 is located in any one of the cells provided by the radio base stations 2A to 2C. Thus, the radio terminal 3 receives the handover destination radio base station information from any one of the radio base stations 2A to 2C providing the cell in which the radio terminal 3 is located.

(1.4) Configuration of Radio Terminal

Figure 6:
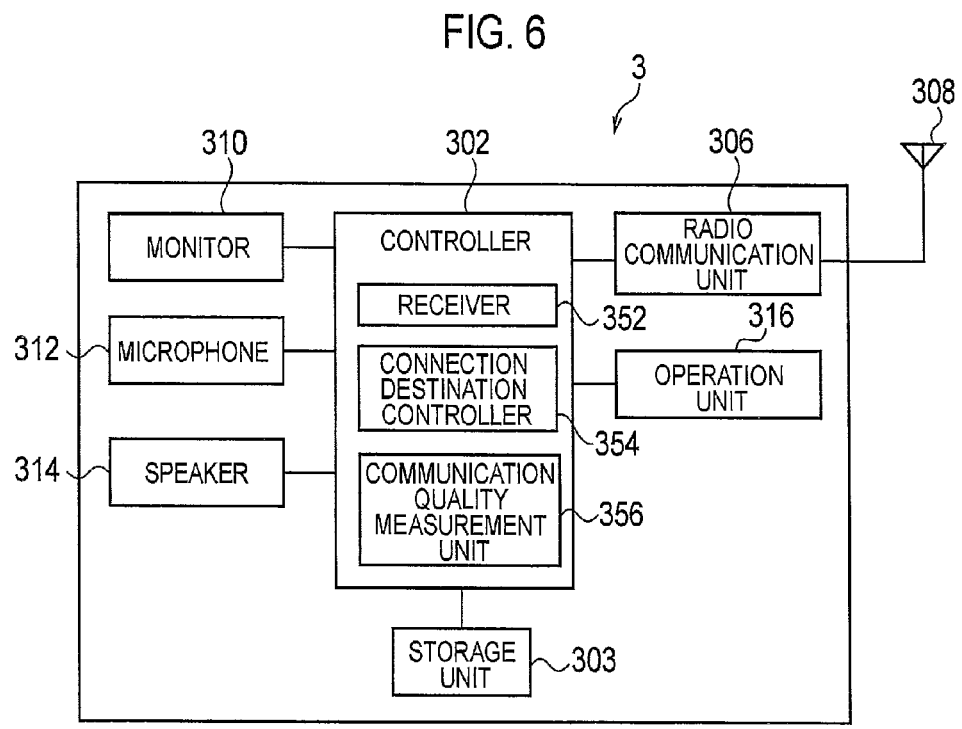
FIG. 6 is a configuration view of a radio terminal according to the embodiment of the present invention.

FIG. 6 is a configuration view of the radio terminal 3. As shown in FIG. 6, the radio terminal 3 includes a controller 302, a storage unit 303, a radio communication unit 306, an antenna 308, a monitor 310, a microphone 312, a speaker 314, and an operation unit 316.

The controller 302 is formed of a CPU for example and controls various functions of the radio terminal 3. The storage unit 303 is formed of a memory for example and stores therein various pieces of information used for the control in the radio terminal 3 or the like.

The radio communication unit 306 includes an RF circuit, a base band circuit and the like, performs modulation/demodulation and coding/decoding, and transmits and receives a radio signal to and from the radio base stations 2A to 2C.

The monitor 310 displays thereon an image and operation (input phone number and addresses) received through the controller 302. The microphone 312 collects sound and outputs sound data based on the collected sound to the controller 302. The speaker 314 outputs sound based on the sound data acquired from the controller 302.

The operation unit 316 is formed of ten-keys, function keys, and the like and is an interface through which a user operation is input.

The controller 302 includes a receiver 352, a connection destination controller 354, and a communication quality measurement unit 356. The receiver 352 receives the list of non-connectable radio base stations or the handover destination radio base station information from any one of the radio base stations 2A to 2C providing the cell in which the own radio terminal 3 is located through the antenna 308 and the radio communication unit 306.

When the receiver 352 receives the list of non-connectable radio base stations, the connection destination controller 354 specifies the radio base station of which the number of unused EPS bearers among the EPS bearers passing through the radio base stations 2A to 2C is not larger than a predetermined number as the connection destination radio base station.

For example, the radio terminal 3 receives a pilot signal and the like from the peripheral radio base stations and the connection destination controller 354 can acquire the base station IDs of the peripheral radio base stations included in the pilot signal. In this case, the connection destination controller 354 may specify the base station ID not included in the list of non-connectable radio base stations from among the acquired base station IDs as the base station ID of the connection destination radio base station.

When the connection destination controller 354 specifies the connection destination radio base station, the controller 302 cooperates with the controller 101 in the communication control device 1 to establish the EPS bearer passing through the connection destination radio base station.

When the receiver 352 receives the handover destination radio base station information, the connection destination controller 354 specifies the radio base station corresponding to the base station ID included in the handover destination radio base station information.

When the connection destination controller 354 specifies the radio base station that is the handover destination, the controller 302 cooperates with the controller 101 in the communication control device 1 to establish the EPS bearer passing through the handover destination radio base station.

The communication quality measurement unit 356 measures the quality of communications between the radio terminal 3 and any one of the radio base stations 2A to 2C. Moreover, the communication quality measurement unit 356 transmits the communication quality to any one of the radio base stations 2A to 2C serving as the communication partner through the radio communication unit 306 and the antenna 308.

(2) Operation of Radio Communication System

Figure 7:
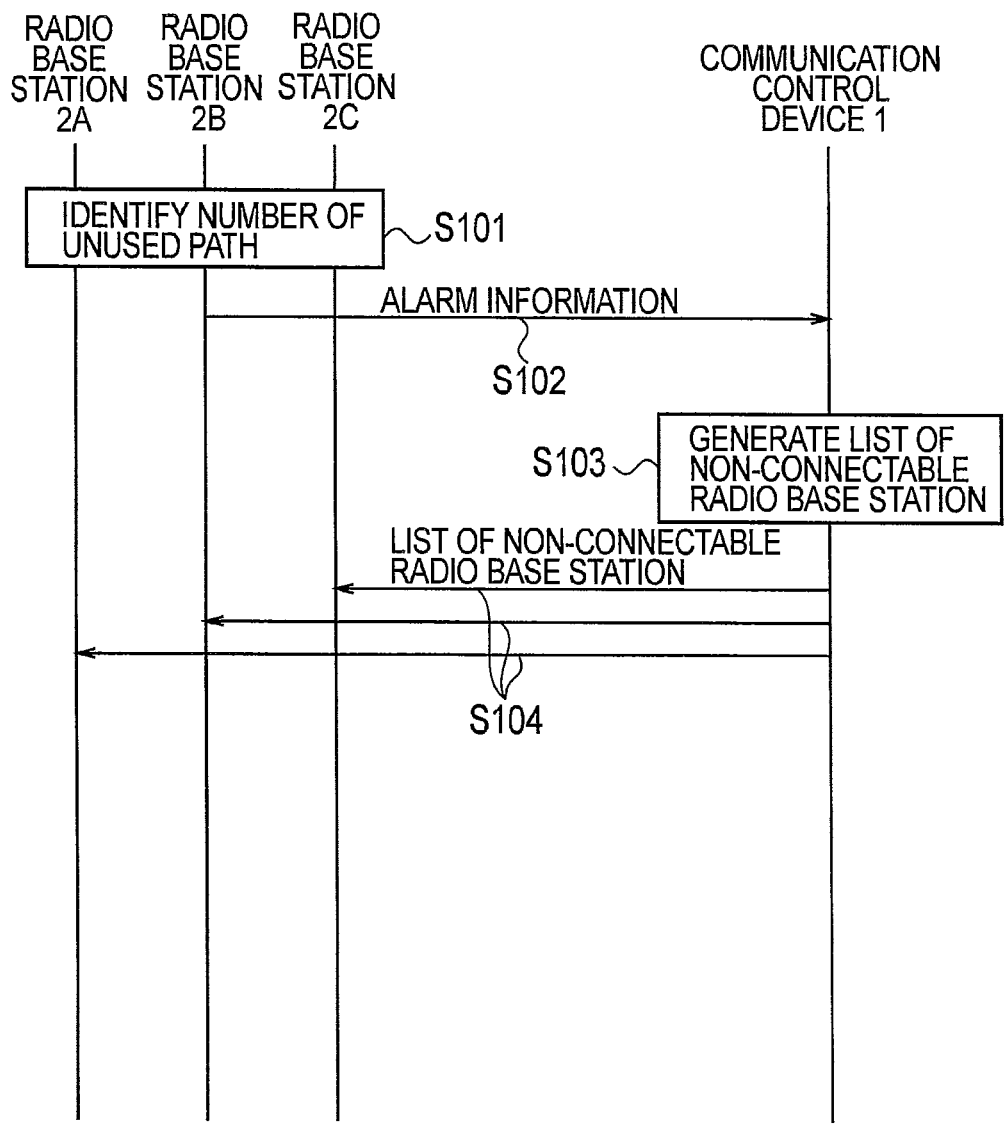
FIG. 7 is a sequence diagram showing a first operation of the radio communication system according to the embodiment of the present invention.

Operations of the radio communication system 10 are described below. FIG. 7 is a sequence diagram showing the first operation of the radio communication system 10.

In Step 101, the controller 202 in each of the radio base stations 2A to 2C identifies the number of unused EPS bearers passing through the own radio base station. In Step 102, the controller 202 in each of the radio base stations 2A to 2C transmits the alarm information including the unused number and the base station ID of the own radio base station to the communication control device 1 when the identified unused number is not larger than the predetermined number. Here, the controller 202 in the radio base station 2B transmits the alarm information to the communication control device 1. The controller 102 in the communication control device 1 receives the alarm information from the radio base station 2B.

In Step S103, the controller 102 in the communication control device 1 generates the list of non-connectable radio base stations that lists the received alarm information. Here, the list of non-connectable radio base station includes the alarm information from the radio base station 2B only.

In Step S104, the controller 102 in the communication control device 1 transmits the list of non-connectable radio base stations to the radio base stations 2A to 2C through broadcast communication. The controller 202 in each of the radio base stations 2A to 2C receives the list of non-connectable radio base stations.

Figure 8:
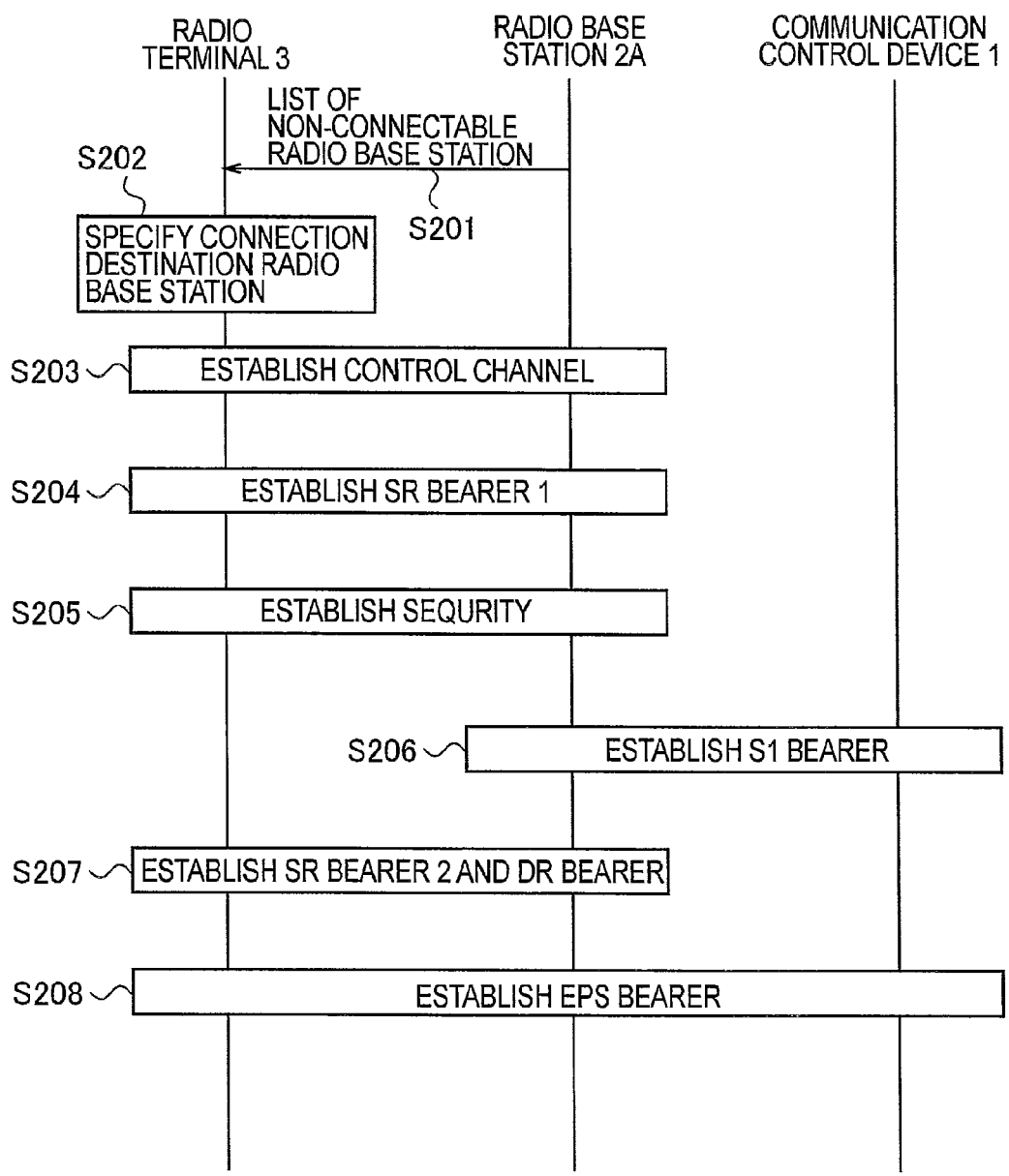
FIG. 8 is a sequence diagram showing a second operation of the radio communication system according to the embodiment of the present invention.

FIG. 8 is a sequence diagram showing a second operation of the radio communication system 10. The operation shown in FIG. 8 is preceded by the operation in FIG. 7. In FIG. 8, the radio terminal 3 is assumed to be located in the cell provided by the radio base station 2A.

In Step S201, the controller 202 in the radio base station 2A transmits the list of non-connectable radio base stations from the communication control device 1 to the radio terminal 3. The controller 302 in the radio terminal 3 receives the list of non-connectable radio base stations.

In Step S202, the controller 302 in the radio terminal 3 specifies the radio base station (radio base station 2A herein) of which the base station ID is not included in the received list of non-connectable radio base stations as the connection destination.

Then, the EPS bearer is established between the communication control device 1 and the radio terminal 3 through the radio base station 2A by a conventional method.

More specifically, in Step S203, the controller 202 in the radio base station 2A and the controller 302 in the radio terminal 3 establish a control channel between the radio base station 2A and the radio terminal 3. In Step S204, the controller 202 in the radio base station 2A and the controller 302 in the radio terminal 3 establish a signal radio (SR) bearer between the radio base station 2A and the radio terminal 3. In Step S205, the controller 202 in the radio base station 2A and the controller 302 in the radio terminal 3 establish a security between the radio base station 2A and the radio terminal 3.

In Step S206, the controller 202 in the radio base station 2A and the controller 102 in the communication control device 1 establish the S1 bearer between the radio base station 2A and the communication control device 1. In Step S207, the controller 202 in the radio base station 2A and the controller 302 in the radio terminal 3 establish the SR bearer 1 and the data radio (DR) bearer between the radio base station 2A and the radio terminal 3.

Then in Step S208, the controller 202 in the radio base station 2A and the controller 102 in the communication control device 1 establish the EPS bearer passing through the radio base station 2A between the communication control device 1 and the radio terminal 3.

Figure 9:
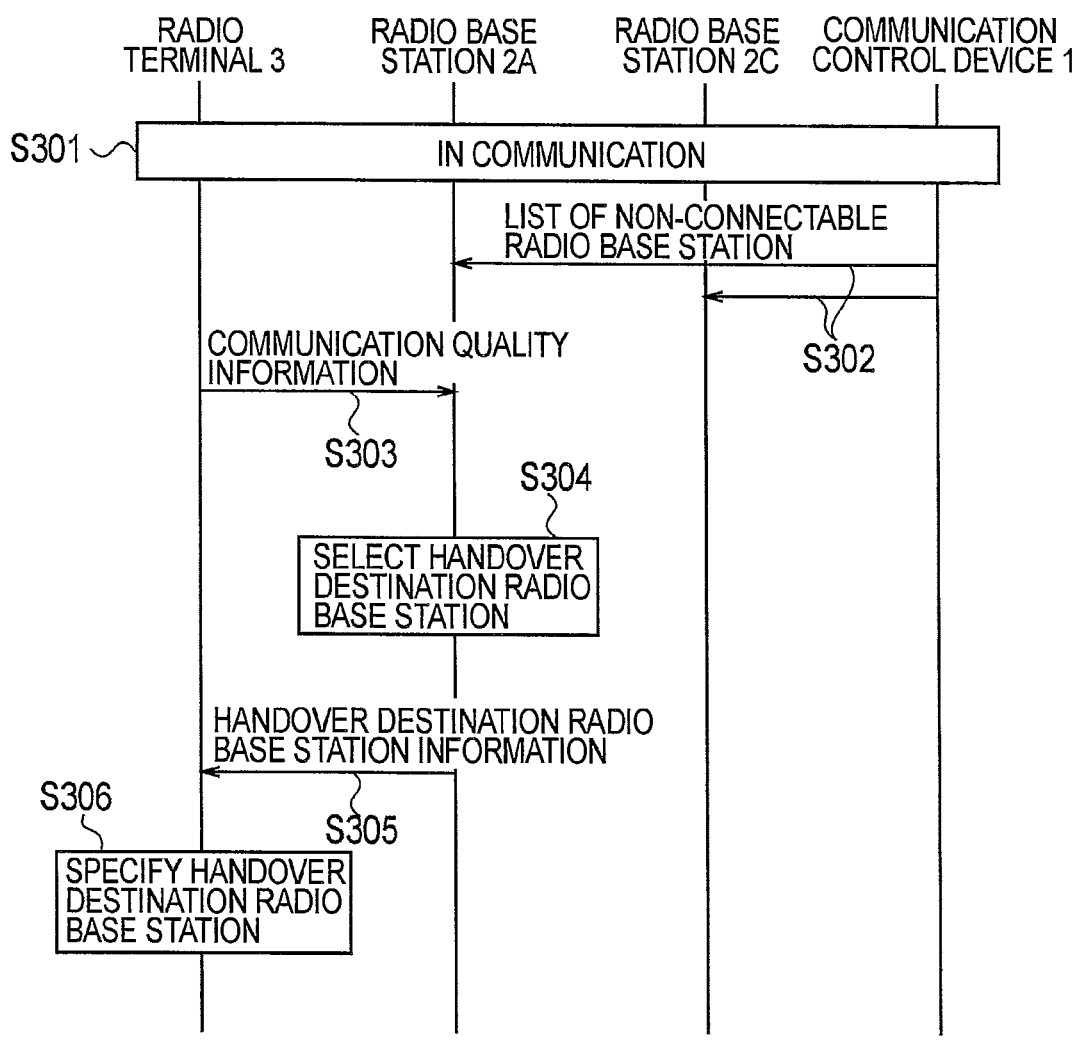
FIG. 9 is a sequence diagram showing a third operation of the radio communication system according to the embodiment of the present invention.

FIG. 9 is a sequence diagram showing a third operation of the radio communication system 10. The operation shown in FIG. 9 is preceded by the operation shown in FIG. 7. In FIG. 9, the radio terminal 3 is assumed to be located in the cell provided by the radio base station 2A.

In Step S301, the radio base station 2A and the radio terminal 3 are in communication with each other. During the communication, in Step S302, the controller 102 in the communication control device 1 periodically transmits the list of non-connectable radio base stations to the radio terminals 2A and 2C. The controller 202 in each of the radio base stations 2A and 2C receives the list of non-connectable radio base stations.

In Step S303, the controller 302 in the radio terminal 3 transmits the communication quality information to the communication partner, i.e., the radio base station 2A. The controller 202 in the radio base station 2A receives the communication quality information.

In Step S304, the controller 202 in the radio base station 2A selects a radio base station (here, the radio base station 2C) of which the base station ID is not included in the list of non-connectable radio base stations as the handover destination radio base station when the communication quality information indicates that the communication quality is not higher than a predetermined level.

In Step S305, the controller 202 in the radio base station 2A transmits handover destination radio base station information including the base station ID of the handover destination radio base station to the radio terminal 3. The controller 302 in the radio terminal 3 receives the handover destination radio base station information.

In Step S306, the controller 302 in the radio terminal 3 specifies the radio base station (here the radio base station 2C)

of which the base station ID is included in the received handover destination radio base station information as the handover destination.

Then, the EPS bearer passing through the radio base station 2C is established between the communication control device 1 and the radio terminal 3 through the processing similar to that in Step 203 to Step S208 in FIG. 8.

(3) Operation and Effect

In the radio communication system 10 according to the embodiment of the present invention, the communication control device 1 collects the number of unused EPS bearers passing through each of the radio base stations 2A to 2C and transmits the numbers to the radio base stations 2A to 2C. Then, the radio base stations 2A to 2C perform a control so that the radio base station with the number of unused EPS bearers passing therethrough being not larger than a predetermined number is selected as the radio base station to which the radio terminal 3 is to be connected on the basis of the received numbers of unused EPS bearers.

Thus, each of the radio base stations 2A to 2C can perform control so that the radio base station to which the radio terminal 3 is to be connected is selected in consideration of not only the state of use of the EPS bearers passing therethrough but also the state of use of EPS bearers passing through the other radio base stations.

Therefore, degradation of communication quality due to the shortage of the unused EPS bearers passing through a radio base station rejecting the request by the communication control device 1 for increasing EPS bearers to the radio base station is prevented. Moreover, when the radio terminal 3 requests call connection to a radio base station, the call is not released due to the shortage of the unused EPS bearers passing through the radio base station.

Each of the radio base stations 2A to 2C transmits alarm information to the communication control device 1 when the number of unused EPS bearers passing therethrough is not larger than the predetermined number (two for example). The communication control device 1 transmits the list of non-connectable radio base stations that lists the alarm information to the radio base stations 2A to 2C.

The number of EPS bearers passing through a radio base station is more likely to be higher than the predetermined number rather than to be not larger than the predetermined number to adversely affect the EPS addition request from the communication control device 1 and the call connection from the radio terminal 3. Thus, alarm information and the list of non-connectable radio base stations are communicated only when the number of unused EPS bearers in the radio base stations 2A to 2C is not larger than a predetermined number. Accordingly, the communication amount can be reduced for the efficient use of communication path.

(4) Other Embodiments

As described above, the details of the present invention have been described by using the embodiment of the present invention. However, it should not be understood that the description and drawings which constitute part of this disclosure limit the present invention. From this disclosure, various alternative embodiments, examples, and operation techniques will be easily found by those skilled in the art.

In the embodiment, the radio base station 2A selects the handover destination for the radio terminal 3 as shown in FIG. 9, and thus the handover is conducted by the radio base station. Instead, the handover may be conducted by the radio terminal 3.

In this case, the radio terminal 3 compares the reception level of the pilot signal and the like from the radio base station serving as the communication partner with the reception level of the pilot signal and the like from the other radio base station. The radio base station 3 specifies the other radio base station as the handover destination when the reception level of the pilot signal and the like from the other radio base station is higher. Then, the EPS bearer passing through the radio base station as the handover destination is established between the communication control device 1 and the radio terminal 3 trough the processing similar to that in Steps S203 to S208.

As described above, the present invention naturally includes various embodiments which are not described herein. Accordingly, the technical scope of the present invention should be determined only by the matters to define the invention in the scope of claims regarded as appropriate from the disclosure.

Note that the entire content of Japanese Patent Application No. 2009-043190 (filed on Feb. 25, 2009) is incorporated herein by reference.

INDUSTRIAL APPLICABILITY

A communication system, a communication control device, a radio base station, and a communication control method of the present invention can appropriately establish logical communication paths and useful for the communication system etc.

The invention claimed is:

1. A communication system comprising a radio terminal, a plurality of radio base stations configured to perform radio communication with the radio terminal, and a communication control device controlling the plurality of radio base stations, in which logical communication paths are established between the radio terminal and the communication control device through each of the radio base stations, wherein
the communication control device includes:
a collector configured to collect, for each of the radio base stations, a state of use of the logical communication paths passing through the radio base station; and
a state-of-use transmitter configured to transmit, to the plurality of radio base stations, the state of use of the logical communication paths passing through each of the radio base stations collected for the radio base station by the collector, wherein the state-of-use transmitter transmits, to the plurality of radio base stations, information on the radio base station of which the number of unused logical communication paths passing therethrough among the logical communication paths passing through the radio base station is not larger than the predetermined number, and
each of the radio base stations includes:
a state-of-use receiver configured to receive the state of use of the logical communication paths passing through each of the radio base stations from the communication control device, wherein the state-of-use receiver receives, from the communication controller, the information on the radio base station of which the number of unused logical communication paths passing therethrough among the logical communication paths passing through the radio base station is not larger than the predetermined number; and a selection controller configured to perform a control to determine the radio base station to which the radio terminal is to be connected based on the state of use of the logical communication paths passing through each of the radio base stations received by the state-of-use receiver, and wherein the selection controller performs a control to select, as a connection destination of the radio terminal, a radio base station other than the radio base station of which the number of unused logical communication paths passing through the radio base station among the logical communication paths passing therethrough is not larger than a predetermined number.

2. The communication system according to claim 1, wherein
the selection controller selects the radio base station that is not the radio base station of which the number of unused logical communication paths passing therethrough is not larger than the predetermined number from the communication control device as the connection destination of the radio terminal, and transmits information on the radio base station that is the connection destination of the radio terminal to the radio terminal, and
the radio terminal includes:
a connection destination receiver configured to receive the information on the radio base station that is the connection destination of the radio terminal from the communication control device; and
a connection controller configured to perform a control to select the connection destination of the radio terminal based on the information on the radio base station that is the connection destination of the radio terminal received by the connection receiver.

3. The communication system according to claim 2, wherein each of the radio base stations further includes an unused number transmitter configured to transmit the number of unused logical communication paths passing therethrough to the communication control device when the number of unused logical communication paths passing through the radio base station is not larger than the predetermined number.

4. The communication system according to claim 1, wherein
the selection controller transmits to the radio terminal, the information on the radio base station of which the number of unused logical communication paths passing therethrough is not larger than the predetermined number from the communication control device, and
the radio terminal includes:
a base station information receiver configured to receive the information on the radio base station of which the number of unused logical communication paths passing therethrough is not larger than the predetermined number; and
a connection controller configured to perform control to select, as the connection destination of the radio terminal, a radio base station other than the radio base station of which the number of unused logical communication paths passing through the radio base station among the logical communication paths passing therethrough is not larger than the predetermined number, based on the information on the radio base station of which the unused number of logical communication paths passing therethrough is not larger than the predetermined number.

5. The communication system according to claim 4, wherein each of the radio base stations further includes an unused number transmitter configured to transmit the number of unused logical communication paths passing therethrough to the communication control device when the number of unused logical communication paths passing through the radio base station is not larger than the predetermined number.

6. The communication system according to claim 1, wherein each of the radio base stations further includes an unused number transmitter configured to transmit the number of unused logical communication paths passing therethrough to the communication control device when the number of unused logical communication paths passing through the radio base station is not larger than the predetermined number.

7. The communication system according to claim 1, wherein a first radio base station comprises a transmitter configured to transmit error information on the first radio base station to the communication control device.

8. The communication system according to claim 1, wherein the communication control device comprises a transmitter configured to transmit, to the plurality of radio base stations, information on a radio base station to which the connection from the radio terminal for handover is barred.

9. The communication system according to claim 1, wherein each of the radio base stations further includes an unused number transmitter configured to transmit the number of unused logical communication paths passing therethrough to the communication control device when the number of unused logical communication paths passing through the radio base station is not larger than the predetermined number.

10. A communication method in a communication system including a radio terminal, a plurality of radio base stations configured to perform radio communications with the radio terminal, and a communication control device controlling the plurality of radio base stations, in which logical communication paths are established between the radio terminal and the communication control device through each of the radio base stations, the method comprising the steps of:
collecting, for each of the radio base stations, a state of use of the logical communication paths passing through the radio base station by the communication control device;
transmitting, by the communication control device, the collected state of use of the logical communication paths passing through each of the radio base stations collected for the radio base station by the collector to the plurality of radio base stations, and transmitting to the plurality of radio base stations, information on the radio base station of which the number of unused logical communication paths passing therethrough among the logical communication paths passing through the radio base station is not larger than the predetermined number;
receiving, by each of the radio base stations, the state of use of the logical communication paths passing through each of the radio base stations from the communication control device, and receiving from the communication controller, the information on the radio base station of which the number of unused logical communication paths passing therethrough among the logical communication paths passing through the radio base station is not larger than the predetermined number; and
performing a control, by each of the radio base stations, to determine the radio base station to which the radio terminal is to be connected based on the received state of use of the logical communication paths passing through each of the radio base stations, and performing a control to select, as a connection destination of the radio terminal, a radio base station other than the radio base station of which the number of unused logical communication paths passing through the radio base station among the logical communication paths passing therethrough is not larger than a predetermined number.

11. The communication method according to claim 10, further comprising the steps of:
  transmitting, by the radio base stations, error information on the radio base stations to the communication control device; and
  transmitting, by the communication control device, information on a radio base station to which the connection from the radio terminal for handover is barred, to the plurality of radio base stations.

* * * * *